United States Patent [19]

Cantalupo et al.

[11] 4,237,258

[45] Dec. 2, 1980

[54] PROCESS FOR PREPARING VULCANIZABLE ACRYLIC ELASTOMERS

[75] Inventors: Giuseppe Cantalupo, Busto Arsizio; Sergio De Servi, Legnano; Agostino Lepori, Fagnano Olona, all of Italy

[73] Assignee: Montedison S.p.A., Milan, Italy

[21] Appl. No.: 29,940

[22] Filed: Apr. 13, 1979

[30] Foreign Application Priority Data

Apr. 14, 1978 [IT] Italy ................ 22324 A/78

[51] Int. Cl.$^3$ .................. C08F 222/02; C08F 224/00
[52] U.S. Cl. .................... 526/273; 525/327; 525/354
[58] Field of Search .......................... 526/273, 292

[56] References Cited

U.S. PATENT DOCUMENTS

| | | | |
|---|---|---|---|
| 3,201,373 | 8/1965 | Kaizerman | 526/292 |
| 3,288,763 | 11/1966 | Waldron | 526/292 |
| 3,488,331 | 1/1970 | Jorgensen | 526/292 |
| 3,493,548 | 2/1970 | Chalmers | 526/292 |
| 3,622,547 | 11/1971 | Ermidis | 526/292 |
| 3,624,058 | 11/1971 | Jorgensen | 526/292 |
| 3,912,672 | 10/1975 | Morris et al. | 260/23 AR |
| 3,976,610 | 8/1976 | Morris et al. | 526/292 |
| 4,056,497 | 11/1977 | Reinecke et al. | 526/292 |

FOREIGN PATENT DOCUMENTS 1175545 12/1969 United Kingdom .

*Primary Examiner*—Harry Wong, Jr.

[57] ABSTRACT

Vulcanizable elastomers consisting of copolymers of acrylic esters are prepared by copolymerizing an alkyl acrylate with minor amounts of an ethylenically unsaturated monomer containing halogen, an ethylenically unsaturated monomer having an epoxy group, an ethylenically unsaturated carboxylic acid and, optionally, a polyene containing at least two non-conjugated double bonds. The new acrylic elastomers obtained have a high vulcanization rate and are useful in the manufacture of various shaped articles by processes involving a fast vulcanization cycle.

13 Claims, No Drawings

PROCESS FOR PREPARING VULCANIZABLE ACRYLIC ELASTOMERS

THE PRIOR ART

Acrylic elastomers consisting of copolymers of alkyl acrylates with other unsaturated monomers and which differ from one another in their properties depending on the number and kind of comonomers used, are known, including acrylic elastomers consisting of copolymers of alkyl acrylates with minor quantities of another vinyl monomer containing halogen, such as: chloroethylvinylether, chloroethyl acrylate or vinyl chloroacetate.

Other vulcanizable elastomers consisting of copolymers of alkyl acrylates with small quantities of another ethylenically unsaturated monomer having an epoxy group, such as: allyl glycidyl ether, glycidyl acrylate or methacrylate are also known.

In addition, are known, in the prior art, acrylic elastomers, vulcanizable by means of polyepoxides, consisting of copolymers of alkyl acrylates with small quantities of acrylic and methacrylic acid optionally in admixture with a considerably smaller amount of a polyene having at least two non-conjugated double bonds, such as allyl acrylate or methacrylate.

These latter elastomers if, on the one hand, displaying excellent mechanical properties, on the other hand have the disadvantage of lacking a high vulcanization rate such as is required for a fast production of various articles, that is for a rational and economical utilization of the molds on a commercial scale.

THE PRESENT INVENTION

One object of this invention is to provide a process which results in vulcanizable acrylic elastomers which do not have the disadvantages and drawbacks of the known vulcanizable acrylic elastomers and which, in addition to good mechanical properties, are characterized by a fast vulcanization rate.

This and other objects are achieved by the invention in accordance with which alkyl acrylates are copolymerized with minor quantities of an ethylenically unsaturated monomer containing halogen, of an ethylenically unsaturated monomer having an epoxy group, and of an ethylenically unsaturated carboxylic acid of the type of acrylic or methacrylic acid. The elastomeric copolymers thus obtained have, besides good mechanical properties, a vulcanization rate considerably higher that that which could rightly be expected on the basis of the vulcanization rates of the copolymers containing the various monomers separately, that is, there has been found an effect of synergism among the three comonomers with regard to the vulcanization rate.

The acrylic elastomers of this invention are thus prepared through a process that consists in subjecting to polymerization at 40°–80° C., in the presence of a radical-yielding initiator, a mixture of monomers consisting prevailingly of an alkyl acrylate in which the alkyl group has 1 to 8 carbon atoms, said process being characterized in that the monomer mixture subjected to polymerization contains, besides the alkyl acrylate, the following comonomers:

(a) 0.5–2% by weight of an ethylenically unsaturated monomer containing halogen, and having one of the following general formulae: R—COOR$_1$; R$_1$—COOR$_2$; or R$_2$—O—R$_1$ wherein R is chloro- or bromoalkyl with from 1 to 3 carbon atoms; R$_1$ is alkenyl with from 2 to 3 carbon atoms; and R$_2$ is chloro- or bromoalkyl with from 1 to 4 carbon atoms;

(b) 0.5–2% by weight of an ethylenically unsaturated monomer containing an epoxy group;

(c) 0.1–1% by weight of one or more ethylenically unsaturated carboxylic acids; and (d) 0–0.1% by weight of a polyene having at least two non-conjugated double bonds;

all of the above percentages being referred to the total of the mixture of monomers.

In the R and R$_2$ groups of the three formulae indicated above, the halogen atom may be attached to any one of the carbon atoms of the alkyl group.

Representative alkyl acrylates useful in the practice of this invention include: ethyl acrylate, n-propyl acrylate, isopropyl acrylate, n-butyl acrylate, n-amyl acrylate and n-hexyl acrylate, the presently preferred alkyl acrylates being ethyl acrylate and n-butyl acrylate.

Examples of specific monomers having the general formula R—COOR$_1$ include vinyl chloroacetate, vinyl bromoacetate, vinyl alpha-chloropropionate, allyl chloroacetate, allyl bromoacetate. The presently preferred monomers are: vinyl chloroacetate and allyl chloroacetate.

Among the useful monomers of formula R$_1$—COOR$_2$ are: chloroethyl acrylate, chloro-n-propyl acrylate, bromo-n-propyl acrylate, chloro-n-butyl acrylate; the presently preferred comonomer of this type being chloroethyl acrylate.

Unsaturated ethers representative of those having the general formula R$_2$—O—R$_1$ are: chloromethylvinyl ether, chloroethylvinyl ether, bromoethylvinyl ether, chloro-n-propylvinyl ether; the presently preferred ether being chloroethylvinyl ether.

Among the useful ethylenically unsaturated monomers having an epoxy group there may be cited: vinylglycidyl ether, allylglycidyl ether, methallylglycidyl ether, glycidyl acrylate, glycidyl methacrylate; the presently preferred epoxy-containing compounds being allylglycidyl ether and glycidyl methacrylate.

Examples of ethylenically unsaturated carboxylic acids useful in practicing the invention include: acrylic acid, methacrylic acid, itaconic acid, maleic acid and fumaric acid. In practical operation, acrylic and/or methacrylic acid are presently preferred.

As useful polyenes having at least two non-conjugated double bonds, there may be cited: divinylbenzene, allylacrylate, allyl methacrylate, ethyleneglycol diacrylate and diethyleneglycol diacrylate. In practice, the use of allyl methacrylate is presently preferred. Such polyenes, use of which is optional, have the effect of causing a slight cross-linking during polymerization, thereby facilitating the subsequent handling of the product during the molding stage.

The polymerization of the mixture of monomers may be carried out according to known techniques, that is, either in solution, in emulsion or in suspension, at a temperature comprised between 40° and 80° C., inclusive, in the presence of radical initiators, such as for instance potassium or ammonium persulphate, hydrogen peroxide, sodium peroxide, benzoyl peroxide, acetyl peroxide, t-butyl-hydroperoxide or thermally unstable diazo-compounds such as azo-bis-iso-butyronitrile.

In the examples given hereinafter, and which are given for illustrative and non-limiting purposes only, the polymerization was carried out in suspension. As suspending agents may be used polyvinyl alcohols containing up to 10% of acetyl groups, soluble starch, methyl celluloses, hydroxyethyl celluloses, sodium carboxymethyl cellulose, polyacrylamides and the salts of the alginate and polyacrylate type.

The various tests were carried out as follows: Into a 1 lt glass reactor fitted with a stirrer, a thermometer, a reflux cooler and a nitrogen-feeding pipe, there were introduced 500 parts (by weight) of deionized water and 0.06 parts of polyvinyl alcohol (Vinavilol 42-88 of Montedison) as a suspending agent, whereupon the mixture was heated in a water bath, while passing through the solution a stream of nitrogen. Once the temperature of this latter had attained 70° C., the nitrogen flow was interrupted and there was added the mixture of monomers, the composition of which is given infra, containing in solution 0.1 part of azo-bis-isobutyronitrile.

During the reaction, the copolymer separates in the form of beads. At the end of the polymerization, the slurry is heated to 80° C. and maintained at this temperature for 1 hour. After this period, the unreacted monomers are steam-distilled and the thus obtained copolymer is separated by filtering and then dried at 80°–90° C.

Referring to the immediately following tabulation, the mixtures of monomers subjected to polymerization in the various tests have the compositions indicated by capital letters, the numbers indicating parts by weight.

(M.S. $T_5$ indicates the time required for the viscosity of the polymer to gain an increase of 5 Mooney units starting from the minimum);

C.R. = the breaking load (ASTM D 412-64 T, specimen D);

A.R. = the elongation at break (ASTM D 412-64 T, specimen D);

M.100% = the elastic modulus at 100% (ASTM D 412-64 T, specimen D);

IRHD = the IRHD hardness (ASTM D 1415—6 mm);

C.S. = the compression set (ASTM D 395-61, method B, 25% set); and

V = the volume variation in the blowing tests (ASTM D 471-64 T, diameter 45 mm—thickness 4 mm).

In Table I there are recorded the results of some comparative tests carried out with polymers obtained from mixtures containing, besides ethyl acrylate, other comonomers for a total of 2.5% by weight. The tests with the mixtures of monomers X, Y are comparative tests and refer to copolymers of the prior art, while the tests with the mixtures from A to F inclusive, refer to copolymers of this invention.

From Table I, it is apparent that the copolymers according to this invention have lower M.S. $T_5$ values and, thus, higher vulcanization rates with respect to those of the prior art. Thus, the synergistic effect of the combination of comonomers of this invention on the

| MONOMERS | X | Y | A | B | C | D | E | F | G | H | I | L | M | N | Z |
|---|---|---|---|---|---|---|---|---|---|---|---|---|---|---|---|
| ethyl acrylate | 97.5 | 97.5 | 97.5 | 97.5 | 97.5 | 97.5 | 97.5 | 97.5 | 98.75 | 96.5 | 97. | 97. | 95. | 97.5 | 95. |
| Allyl-glycydylether | — | 1.25 | 1. | — | — | — | 1. | 1. | 0.50 | 0.50 | 1. | 2. | 2. | 1. | — |
| glycidyl methacrylate | — | — | — | 1. | 1. | 1. | — | — | — | — | — | — | — | — | — |
| vinyl chloroacetate | 2. | 1.25 | — | 1. | — | — | 1. | 1. | 0.50 | 2. | 1. | 0.50 | 2. | 1. | 5. |
| allyl chloroacetate | — | — | 1. | — | 1. | — | — | — | — | — | — | — | — | — | — |
| chloroethyl-vinyl-ether | — | — | — | — | — | 1. | — | — | — | — | — | — | — | — | — |
| acrylic acid | 0.25 | — | 0.25 | 0.25 | 0.25 | 0.25 | 0.50 | — | 0.125 | 0.50 | 0.50 | 0.25 | 0.50 | 0.25 | — |
| methacrylic acid | 0.25 | — | 0.25 | 0.25 | 0.25 | 0.25 | — | 0.50 | 0.125 | 0.50 | 0.50 | 0.25 | 0.50 | 0.25 | — |

In Tables I, II and III that follow:
M.S. $T_5$ at 143° C. = Mooney Scorch $T_5$, determined at 143° C. (according to ASTM D 1646 rule, with Sharp rotor)

vulcanization rate of the copolymers is clearly demonstrated.

TABLE I

Characteristics of Vulcanized Products (Comparative Tests)

| TEST | M.S. $T_5$ at 143° C. | C.R. Kg/cm$^2$ | A.R. % | M.100% Kg/cm$^2$ | IRHD points | C.S. 70 hrs. at 175° C. % | 70 hrs. at 150° C. in oil ASTM n.3 Δ V | 70 hrs. at 100° C. in water Δ V | 70 hrs. at 175° C. in air Δ IRHD |
|---|---|---|---|---|---|---|---|---|---|
| X | 4$^m$0$^s$ | 145 | 360 | 32 | 50 | 52 | +14 | +27 | −3 |
| Y | 14$^m$30$^s$ | 151 | 420 | 27 | 49 | 73 | +14 | +25 | +3 |
| A | 3$^m$6$^s$ | 146 | 270 | 38 | 57 | 72 | +14 | +25 | +6 |
| B | 2$^m$36$^s$ | 158 | 140 | 76 | 63 | 68 | +14 | +19 | +4 |
| C | 2$^m$0$^s$ | 149 | 140 | 75 | 60 | 71 | +13 | +20 | +7 |
| D | 2$^m$48$^s$ | 131 | 140 | 61 | 61 | 76 | +13 | +16 | +11 |
| E | 3$^m$30$^s$ | 148 | 300 | 35 | 56 | 73 | +13 | +27 | +5 |
| F | 3$^m$0$^s$ | 150 | 280 | 40 | 57 | 70 | +14 | +27 | +4 |

NOTES:
(1)The vulcanized products have been obtained from blends contaning:

| | Parts by Weight |
|---|---|
| Elastomer | 100 |
| Steric acid | 1 |
| Carbon black FEF N 550 (Cabot Corp.) | 50 |
| Sodium stearate | 2.25 |

TABLE I-continued

| | | | | | | | C.S. 70 hrs. at 175° C. % | 70 hrs. at 150° C. in oil ASTM n.3 Δ V | 70 hrs. at 100° C. in water Δ V | 70 hrs. at 175° C. in air Δ IRHD |
|---|---|---|---|---|---|---|---|---|---|---|
| TEST | M.S. T$_5$ at 143° C. | C.R. Kg/cm$^2$ | A.R. % | M.100% Kg/cm$^2$ | IRHD points | | | | | |
| | | Potassium stearate | | | | | | 0.75 | | |
| | | Sulphur | | | | | | 0.25 | | |

Characteristics of Vulcanized Products (Comparative Tests)

(2) Vulcanization conditions: 30$^m$ at 155° C. in a compression press and subsequent curing in a circulating air oven at 150° C. for 24 hours.

Table II reports the results of other tests carried out with copolymers according to the invention obtained from mixtures containing, besides ethyl acrylate, other comonomers in varying quantities.

TABLE II

Characteristics of Vulcanized Products

| TEST | M.S. T$_5$ at 143° C. | C.R. Kg/cm$^2$ | A.R. % | M.100% Kg/cm$^2$ | IRHD points | C.S. 70 hrs. at 175° C. % | 70 hrs. at 150° C. in oil ASTM n.3 Δ V | 70 hrs. at 100° C. in water Δ V | 70 hrs. at 175° C. in air Δ IRHD |
|---|---|---|---|---|---|---|---|---|---|
| G | 7$^m$0$^s$ | 119 | 630 | 15 | 47 | 80 | +14 | +27 | −1 |
| H | 2$^m$42$^s$ | 159 | 270 | 39 | 52 | 54 | +14 | +27 | +1 |
| I | 3$^m$24$^s$ | 162 | 270 | 42 | 59 | 74 | +14 | +26 | +6 |
| L | 3$^m$36$^s$ | 158 | 230 | 43 | 58 | 70 | +14 | +2 | +5 |
| M | 2$^m$18$^s$ | 161 | 170 | 50 | 61 | 58 | +13 | +23 | +3 |

NOTE:
The formulation and the vulcanization conditions are the same as those adopted for the tests reported in Table I.

In Table III comparison is made between a copolymer according to this invention, obtained from the mixture of monomers N, and a copolymer of the prior art obtained from the mixture of monomers Z. The vulcanization conditions are those adopted for the runs of Tables I and II, but the formulation differs for the quantities of sodium and potassium stearate, which amount, respectively, to 0.75 and 0.25 parts (instead of 2.25 and 0.75 parts).

From Table III it is seen that, while the copolymer of test N still shows an appreciable vulcanization rate (corresponding to a Mooney scorch value of 7$^m$0$^s$), the copolymer of test Z, on the contrary, practically does not vulcanize anymore in the presence of the reduced quantity of vulcanizer used in the two tests, although for its preparation there had been used 5% of vinyl chloroacetate, and that for the preparation of the copolymer N there had been used only 2.5% of comonomers, all of which proves, once again, the synergism existing among the comonomers of this invention with regard to the vulcanization rate.

TABLE III

| TEST | M.S. T$_5$ at 143° C. | C.R. Kg/cm$^2$ | A.R. % | M.100% Kg/cm$^2$ | IRHD points | C.S. 70 hrs. at 175° C. % | 70 hrs. at 150° C. in oil ASTM n.3 Δ V | 70 hrs. at 100° C. in water Δ V | 70 hrs. at 175° C. in air Δ IRHD |
|---|---|---|---|---|---|---|---|---|---|
| N | 7$^m$0$^s$ | 141 | 540 | 15 | 47 | 62 | +14 | +18 | −2 |
| Z | No increment at 30$^m$ | Vulcanization insufficent under the conditions adopted. | | | | | | | |

The tests reported in the preceding Tables were carried out by using a particular vulcanizing system. Other vulcanizing systems normally used in the vulcanization of acrylic elastomers can also be used.

The acrylic elastomers of this invention are particularly suited for the production of manufactured articles which require a good resistance to oils and to high temperatures, besides a low elasticity modulus and a good "compression set". Due to their high vulcanization rate, the present acrylic elastomers are suited for use in the manufacture of various articles in processes involving a fast vulcanization cycle.

What is claimed is:

1. Process for the preparation of vulcanizable acrylic elastomers by polymerization, at 40°–80° C. and in the presence of a radical-yielding initiator, of a mixture of monomers consisting prevailingly of an alkyl acrylate in which the alkyl has from 1 to 8 carbon atoms, characterized in that the mixture of monomers subjected to polymerization contains, besides the alkyl acrylate, the following comonomers:

(a) 0.5–2% by weight of an ethylenically unsaturated monomer containing halogen and having one of the following general formulae: R—COOR$_1$; R$_1$—COOR$_2$; or R$_2$—O—R$_1$ wherein R is chloro- or bromoalkyl C$_{1-3}$; R$_1$ is alkenyl C$_{2-3}$; and R$_2$ is chloro- or bromoalkyl C$_{1-4}$;

(b) 0.5–2% by weight of an ethylenically unsaturated monomer containing an epoxy group and selected from the group consisting of vinyl glycidyl ether, allyl glycidyl ether, methallyl glycidyl ether, glycidyl acrylate and glycidyl methacrylate;

(c) 0.1–1% by weight of at least one ethylenically unsaturated carboxylic acid selected from the group consisting of acrylic acid, methacrylic acid, itaconic acid, maleic acid and fumaric acid; and (d) 0–0.1% by weight of a polyene having at least two non-conjugated double bonds;

all of the above percentages being referred to the total of the mixture of the monomers.

2. The process of claim 1, in which the alkyl acrylate is ethyl acrylate.

3. The process of claim 1, in which the alkyl acrylate is ethyl acrylate and the comonomers are vinyl chloroacetate, glycidyl methacrylate and acrylic acid.

4. The process of claim 1, in which the alkyl acrylate is ethyl acrylate and the comonomers are vinyl chloroacetate, glycidyl methacrylate and methacrylic acid.

5. The process of claim 1, in which the alkyl acrylate is ethyl acrylate and the comonomers are allyl chloroacetate, allyl glycidyl ether and acrylic acid.

6. The process of claim 1, in which the alkyl acrylate is ethyl acrylate and the comonomers are allyl chloroacetate, allyl glycidyl ether and methacrylic acid.

7. The process of claim 1, in which the alkyl acrylate is ethyl acrylate and the comonomers are allyl chloroacetate, glycidyl methacrylate and acrylic acid.

8. The process of claim 1, in which the alkyl acrylate is ethyl acrylate and the comonomers are allyl chloroacetate, glycidyl methacrylate and methacrylic acid.

9. The process of claim 1, in which the alkyl acrylate is ethyl acrylate and the comonomers are chloroethylvinyl ether, glycidyl methacrylate, and acrylic acid.

10. The process of claim 1, in which the alkyl acrylate, is ethyl acrylate and the comonomers are chloroethylvinyl ether, glycidyl methacrylate and methacrylic acid.

11. The process of claim 1, in which the alkyl acrylate is ethyl acrylate and the comonomers are vinyl chloroacetate, allylglycidyl ether, and acrylic acid.

12. The process of claim 1, in which the alkyl acrylate is ethyl acrylate and the comonomers are vinyl chloroacetate, allylglycidyl ether and methacrylic acid.

13. Vulcanizable acrylic elastomers, prepared by the process of claim 1.

* * * * *